Oct. 28, 1958    M. P. ROKOS    2,857,778
AUTOMATIC WEAR-COMPENSATING BACK LASH TAKE-UP DEVICE
Filed Feb. 15, 1954

INVENTOR.
MICHAEL P. ROKOS,
BY
ATTORNEY.

United States Patent Office 2,857,778
Patented Oct. 28, 1958

2,857,778

AUTOMATIC WEAR-COMPENSATING BACK LASH TAKE-UP DEVICE

Michael P. Rokos, Oakview, Calif.

Application February 15, 1954, Serial No. 410,067

10 Claims. (Cl. 74—441)

This invention relates to an automatic slack takeup means for machine tool feeding mechanisms and more particularly to a positive feed attachment for machine tools such as lathes, milling machines and the like wherein variations in wear in the feeding mechanism may be automatically compensated for to provide immediate precise positioning of a cutting tool.

In machine tools and particularly machine tools having bidirectional or multidirectional feeding mechanism for example a cutting tool may be advanced or retracted for selective positioning with respect to a workpiece by means of a feed screw. Heretofore the cutting tool was usually secured in selected cutting position by means of one or more lock nuts. Accurate positioning of such a cutting tool requires a high degree of individual skill and care of an operator who is intimately familiar with the characteristics of the particular machine. The operator must know the wear characteristics of the feed screw along the length thereof in order to precisely position the cutting tool and to prevent tool chatter. In bidirectional feeds end play or slack between the feed screw and the feed nut means depends upon the amount of wear therebetween and usually upon a change in direction of feed slack resulting from said wear produces a flat spot on the workpiece being cut because of the temporary hesitation of the cutting tool at the point of reversal. When the slack characteristics or the amount of wear between the feed screw and the feed nut means becomes too great, a new shaft and feed nut means is substituted therefor.

This invention contemplates a novel automatic bidirectional wear compensating slack takeup feed means for machine tools wherein prior disadvantages are overcome and automatic precise positioning of a cutting tool is achieved without the requirement of intimate familiarity with a machine by an operator.

This invention contemplates improvements on back lash takeup devices for machine tools of the general character shown in United States Patent 2,610,519 and described and claimed in my copending application for patent, Serial No. 346,997.

The primary object of this invention is to disclose and provide an automatic wear compensating back lash takeup device which is adapted for use on various types of machinery and whereby a cutting tool may be quickly and precisely positioned without slack or end play in the tool feed mechanism.

An object of this invention is to disclose and provide an improved back lash device for machine tool feeding mechanism which is automatically adjustable for variations in wear along a feed screw.

Another object of this invention is to disclose and provide an improved back lash device which may be easily and readily manufactured without special machining or fabrication.

A further object of this invention is to disclose and provide an improved back lash device for a machine tool feeding mechanism wherein a machine tool may be precisely positioned by advancement or retraction of the tool to a preselected point and wherein end play or slack is automatically eliminated.

A further object of this invention is to disclose and provide an improved back lash takeup device for machine tool feeding mechanisms of bidirectional or multidirectional type wherein upon change of direction the cutting tool is immediately responsive thereto with the result that flat spots for example are not produced on the workpiece upon such change in direction of feed.

A still further object of this invention is to disclose and provide an automatic wear compensating and back lash takeup device for machine tool feeding mechanisms wherein the device of this invention is capable of automatically relieving any binding or tightening of the feed nut means upon worn portions of a feed screw.

A more particular object of this invention is to disclose and provide a construction for a feed nut means for use on a machine tool feeding mechanism wherein the feed nut means includes removable and replaceable insert members adapted to cooperate therewith in novel manner.

This invention contemplates a novel improved feeding mechanism for machine tools wherein feed nut means in threaded engagement with a feed screw comprises a pair of spaced feed nuts one of which is relatively loosely connected to a tool slide member and means whereby said spaced feed nuts may be urged and resiliently held in selected spread apart relation.

Generally speaking this invention contemplates an immediately acting bidirectionally back lash takeup means for a tool feeding mechanism which is adapted to precisely position at all times a cutting tool and which includes a feed nut means threaded on a rotatable feed screw. The feed nut means includes a pair of spaced apart feed nuts one of which may be mounted for limited movement relative to the other nut and means carried by one of said feed nuts for abutting engagement with the other feed nut. Spring means are provided for biasing the last-mentioned means into said abutting engagement with the other feed nut so that the spaced feed nuts are sperad apart whereby one feed nut is adapted to engage the feed screw without slack when the tool is advanced in one direction and the other feed nut is arranged to engage the feed screw when the tool is advanced in another direction without end play or slack. The invention contemplates that one or both of the spaced apart feed nuts may be provided with an insert member having threaded engagement with the feed nut with which it is associated, the latter threaded engagement being along threads pitched in a direction opposite to the threads of the feed screw.

Other purposes and advantages of this invention will be readily apparent from the following description of the drawings in which exemplary embodiments of this invention are illustrated.

Figure 1:
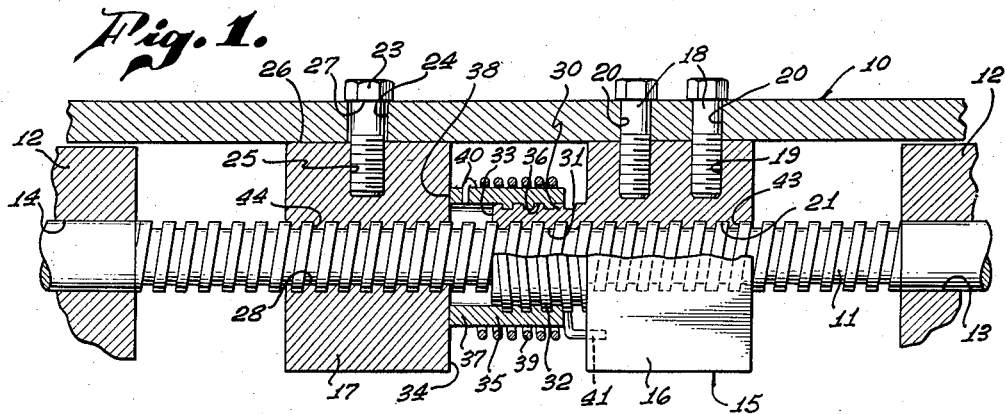
Fig. 1 is a fragmentary sectional view of a feed mechanism for a machine tool embodying this invention, the section being taken generally in a vertical plane passing through the axis of the feed mechanism.

In the exemplary embodiments shown it is understood that the feeding mechanism may be employed for various machine tools such as milling machines, lathes and the like. For purposes of explanation a machine tool feeding mechanism as provided on a lathe may include a tool slide member 10 carried by and advanced by a feed screw 11. The details of the tool slide member and its association with a cross slide carriage and bed are not shown since they are well known in the art. The tool slide member 10 is adapted to be longitudinally advanced and retracted by rotating a well-known type of feed handle (not shown) which may be connected to feed screw 11 in well-known manner. The feed screw 11 may be journaled at opposite ends in a carriage 12 as illustrated at 13 and 14.

Feed nut means generally indicated at 15 (Fig. 1) are connected to the tool slide member 10 and are provided threaded engagement with the feed screw 11 so that as the feed screw 11 is rotated the tool slide member 10 may be advanced or retracted. The feed nut means 15 comprises a pair of longitudinally spaced apart feed nuts 16 and 17. Feed nut 16 may be rigidly connected to the tool slide member 10 as by a pair of longitudinal spaced bolts 18 extending through openings 20 in the tool slide member 10 and having threaded engagement with threaded bores 19 in the upper portion of feed nut 16. The bolts 18 are provided minimum clearance with openings 20 in the tool slide member 10 so that when the bolts 18 are drawn tight, the feed nut 16 is immovably and rigidly secured to the tool slide member 10. The feed nut 16 is provided with a threaded bore 21 aligned and threadedly engaging with feed screw 11.

The feed nut 17 may be loosely connected to the tool slide member 10 by a bolt 23 which extends through an opening 24 in the member 10 for threaded engagement with a threaded bore 25 in the upper portion of feed nut 17. The feed nut 17 is afforded a relatively loose connection with the tool slide member 10 in a longitudinal direction by elongating the opening 24 in the member 10 in the direction of the feed screw 11. The bolt 23 is not drawn tight so that relative movement of feed nut 17 with respect to feed nut 16 and also the tool slide member 10 in the direction of the feed screw may be afforded as by sliding engagement of a top surface 26 of feed nut 17 with a complementary bottom surface of the tool slide member 10. Slidable engagement is also provided between the bottom annular surface 27 of the head of the bolt 23 with the top surface margins of the member 10 which surround the elongated opening 24.

The feed nut means 17 is provided with an internally threaded bore 28 aligned with bore 21 and threaded substantially in phase with the threads of feed nut 16. The feed nut 17 threadedly engages feed screw 11 and it will be apparent from its loose connection to the tool slide member 10 that some relative longitudinal movement by feed nut 17 on the feed screw will be provided depending upon the condition of the threaded engagement of the feed nut 17 with the screw 11. The loose connection of feed nut 17 will thus compensate for variations or differences in wear along the feed screw 11 and occurring in the threaded engagement of the feed screw with the feed nut 17. The particular manner in which the feed nut 17 compensates for wear will be described hereinafter.

Means are provided between the spaced feed nuts 16 and 17 for automatically taking up and eliminating end play or slack between the respective threaded engagements of the feed nuts 16 and 17 with the feed screw so that a cutting tool carried between tool slide member 10 may be precisely positioned upon either advancement or retraction of the tool. In the example shown in Fig. 1 the back lash takeup means may comprise an extension means 30 carried by feed nut 16 and projecting toward feed nut 17. The extension means 30 may comprise a cylindrical member integral with feed nut 16 and having internal threads 31 engaging feed screw 11 and cut as a continuation of the internal threads 21 on the feed nut 16. The cylindrical member is provided with external threads 32 which are pitched in a direction opposite to the pitch of the threads of the feed screw 11. The end face 33 of extension means 30 is spaced from an opposed flat end face 34 of feed nut 17 a distance at least greater than the pitch of the threads of feed screw 11.

A movable spreader nut 35 is carried by extension means 30 and is provided with internal threads 36 adapted to threadedly engage the external threads 32 of the extension means. The movable nut 35 may include an unthreaded head portion 37 positioned between the end 33 of the extension means and the end face 34 of the feed nut 17. The head portion 37 is provided with a flat annular edge face 38 which is adapted to be urged into flat face-to-face abutting engagement with the flat end face 34 of the feed nut 17.

Means for urging the movable nut 35 into such engagement with feed nut 17 may comprise a coil spring 39 which encircles the external surface of the movable nut 35 and which may be secured at one end as at 40 to the movable nut. The other end of spring 39 may be secured as at 41 to the rigid feed nut 16. The spring 39 is disposed so as to bias the movable nut 35 away from feed nut 16 and toward feed nut 17 and thus cause the movable nut 35 to spread apart the feed units 16 and 17.

In the operation of the feeding mechanism shown in Fig. 1 as feed screw 11 is rotated toward the right, for example, by a handle not shown positioned at the right of Fig. 1, the tool slide member 10 will be advanced to the left as viewed in Fig. 1. Upon advancement of the tool slide member 10 to the left, the rigid fixed feed nut 16 serves to push member 10 and frictional driving engagement is provided between forwardly facing portions of the threads of the feed screw and the rearwardly facing portions of the internal threads of the feed nut 16 as at 43. Normally feed nut 17 would also operate to push to the left in the same manner as the feed nut 16; however, movable nut 35 is biased against the flat end face 34 of the loosely connected feed nut 17 and spreads apart said feed nuts so that slidable engagement is provided between the rearwardly directed thread faces of the feed screw and the forwardly directed faces of the internal threads of feed nut 17 as at 44. The biasing force of the coil spring 39 is selected so that the movable nut will be afforded slight pressure contact against the flat end face 34 in order to spread apart as above described the fixed feed nut 16 and the loosely connected feed nut 17.

It is important to note that since the threaded engagement of the movable nut with the extension means 30 is along threads pitched in a direction opposite to the pitch of the feed nut, said threaded engagement of the movable nut results in the functioning of the oppositely directed threads as wedge means for frictionally resisting any tendency of the spaced feed nuts to move toward each other. It will thus be readily apparent that as tool slide member 10 carrying the cutting tool to be positioned is advanced to the left as in Fig. 1, end play between feed nut 16 and feed screw 11 is entirely eliminated and when the tool is brought to a selected position and advancement thereof stops, the tool will be precisely and accurately positioned.

It is also important to note from the description of the construction described above that the feed nut means of this invention readily adapts itself to differences and variations in wear which might occur along the length of feed shaft 11 upon prolonged use of the feed shaft and a feed nut means. Compensation for such differences in wear is automatically provided by the feed nut means construction described above because when differences in wear of the threads of the said feed screw occur between the threaded engagement of feed nuts 16 and 17 with the feed screw, the loosely connected feed nut 17 will automatically compensate for such differences in wear. Because of the loose connection of feed nut 17 to the tool slide member 10 as provided by the longitudinally elongated opening 24 the feed nut 17 is yieldably responsive to such differences in wear and movable relative to the feed nut 16. The movable nut 35 is continuously operative to bias the loosely connected feed nut 17 away from the fixed feed nut 16 so that at all times the two feed nuts are under the influence of a yieldable biasing force which tends to spread them apart and to thus cause automatic takeup of end play. In the event the differences in wear cause feed nuts 16 and 17 to draw toward each other, the movable nut 35 is capable of yielding to such binding pressures and the feed nut 17 is capable of moving toward the fixed feed nut 16 because of its loose connection. Thus any tendency to bind because of differences in wear is automatically compensated for.

Figure 2:
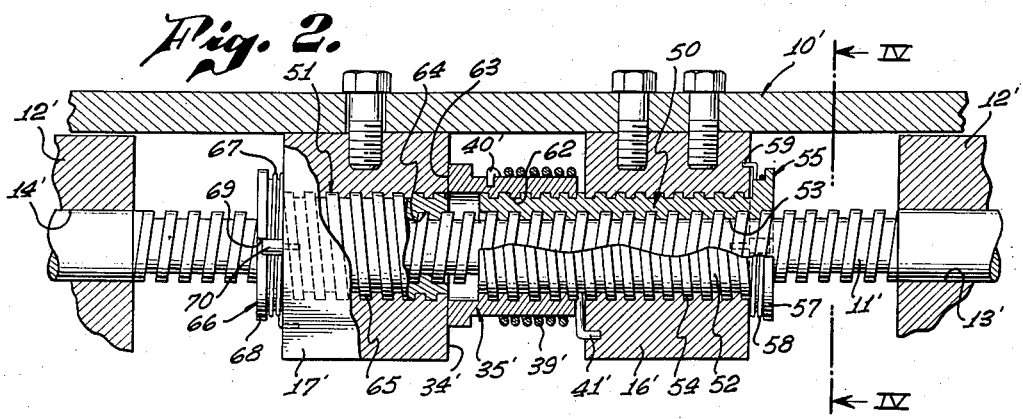
Fig. 2 is a fragmentary view of a different embodiment of the invention shown in Fig. 1, the section being likewise taken generally in a vertical plane passing through the axis of the feed means.
Figure 3:
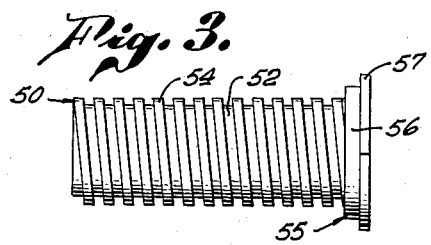
Fig. 3 is a side view of an insert member employed with the embodiment shown in Fig. 2.
Figure 4:
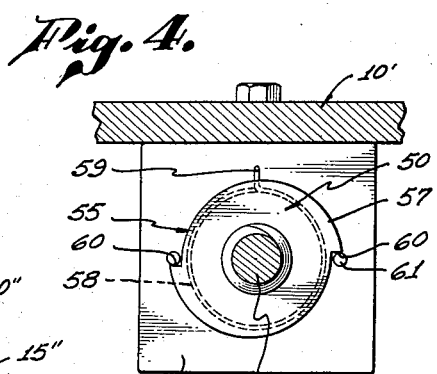
Fig. 4 is a fragmentary sectional view taken in the transverse plane indicated by line IV—IV of Fig. 2.

In the modification shown in Fig. 2, a feed nut construction is illustrated which embodies the principles of operation described with respect to the structure shown in Fig. 1, but which is differently constructed for lending itself to ease of manufacture. Like parts will be identified with like reference numerals with a prime sign.

In Fig. 2 a feed shaft 11', a tool slide member 10', and journal supports at 13' and 14' for the feed screw in a carriage 12' may be as described for the embodiment in Fig. 1. Likewise, the manner of rigidly connecting feed nut 16' and loose connecting of feed nut 17' to the tool slide member may be as described in Fig. 1.

In place of direct threaded engagement of feed screw 11' with spaced feed nuts as described in Fig. 1, in Fig. 2, insert members 50 and 51 are provided respectively for feed nuts 16' and 17' and are of similar construction. The insert member 50 includes a shank 52 provided with internal threads 53 adapted to threadedly engage the threads of the feed screw 11'. The shank 52 is also provided with external threads 54 pitched in a direction opposite to the threads of the feed screw 11' and adapted to engage internal threads in feed nut 16'. The insert member 50 may be provided with a head 55 including a cylindrical portion 56 of a diameter greater than the outer diameter of the threads 54 and flange portions 57 of greater diameter than cylindrical surface 56 and eccentrically arranged with respect thereto. The cylindrical surface 56 of the head portion 55 may carry a coil spring 58 for biasing the insert member to the right as viewed from the right of Fig. 2. The spring 58 may be connected at one end as at 59 to the fixed feed nut 16' and at its other end in well-known manner to head portion 55. The eccentrically arranged flange portions 57 may each extend over approximately 180° so as to form shoulders 60 which are adapted to abut diametrically opposite stop pins 61 carried by the fixed feed nut 16' and projecting outwardly from the outer end face thereof. The abutment of shoulders 60 with stop pins 61 limits turning of the insert member 50 to the right.

The insert member 50 may be of a length selected so as to extend beyond the inner end face of feed nut 16' so that the inner end of insert member 50 may function in the same manner as the extension means 30 described in the prior embodiment. On the inner end of insert member 50 may be carried a movable nut 35', said movable nut having internal threads threadedly engaging as at 62 the external threads of the insert member. The movable nut 35' carries a coil spring 39' sleeved thereover and connected thereto as at 40'. The other end of the spring 39' may be connected to the feed nut 16' as at 41'. The spring 39' biases the movable nut 35' into flat face pressure contact as at 63 with a flat inner end face 34' of the feed nut 17'.

The loosely connected feed nut 17' is likewise provided with insert member 51, said insert member 51 being shorter than insert member 50 so as not to extend beyond inner end face 34' of feed nut 17'. The insert member 51 thus is provided with internal threads which threadedly engage as at 64 the threads of the feed screw 11' and external threads pitched in a direction opposite to the threads of the feed screw for threaded engagement as at 65 with the internal threads of the feed nut 17'. The insert member 50 has a head portion 66 adapted to carry a spring 67 which biases insert member 51 to the right as viewed from the left of Fig. 2. The head portion 66 is provided with substantially semi-circular eccentric radially outwardly extending flange portions 68 which form shoulders 69 adapted to abut stop pins 70 carried in the outer end face of feed nut 17'.

Insert member 50 and 51 are installed by threading into respective feed nuts 16' and 17' from the outer faces thereof. Each head portion 55 and 66 is normally spaced a slight distance away from the opposed outer end face of the associated feed nut and with shoulders normally out of abutment with the stop pins. The stop pins are thus specifically located with respect to the internal threading of the feed nuts.

In the operation of the feed nut means provided with the insert members 50 and 51, advancement of the tool to the left of Fig. 1 causes insert member 50 to push the slide member 10' forwardly while the other insert member 51 is held snugly against the feed nut 16' by the action of the movable spreader nut 35' and the springs. The feed nut 17' is thus in position for commencing feeding in the reverse direction without slack or end play. When the feed nut means comes to a portion of the feed screw where the threads are not so worn and the insert members 50 and 51 begin to sense the pinching effect of such variation in thread wear, the insert member which is not pushing the slide member will relieve the pinching effect as by slightly unscrewing to permit only the necessary relief. The slight unscrewing is due to the fact that the threaded engagement of the insert member with the feed nuts is pitched in a direction opposite to the pitch of the feed screw threads. The position of the stop pins with respect to the threads on the feed screw will permit the insert members to hold under pressure while each affords relief in one direction of feed when necessary.

Figure 5:
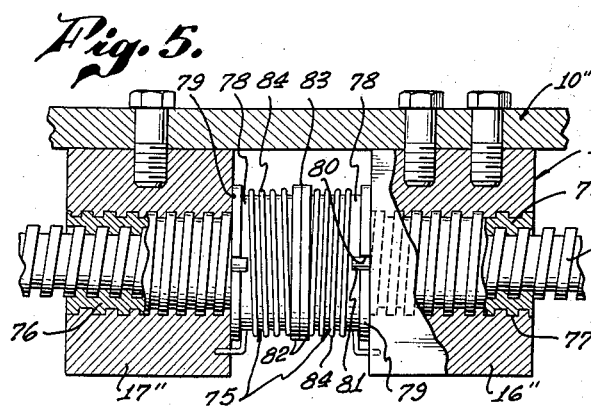
Fig. 5 is a fragmentary sectional view of still another embodiment of this invention, the section being taken generally in a longitudinal vertical plane passing through the axis of the feed means.

In Fig. 5 another embodiment of this invention is shown and wherein the movable nut described between the spaced feed nuts is eliminated.

In this embodiment the means for spreading apart the spaced feed nuts 16" and 17" of the feed nut means 15" may comprise a pair of insert members 75 each threaded into the feed nuts from the inner faces thereof. Each insert member 75 is identical in construction and each includes a shank 76 provided with internal threads for threaded engagement in one direction with the threads of the feed screw 11". The shank 76 is also provided with external threads pitched in the same direction as the pitch of the threads of the feed screw and having a threaded engagement as at 77 with a threaded bore in the associated feed nut. Each insert member 75 may be provided with an enlarged head portion 78 having an inner radially outwardly extending annular flange 79 constructed in the manner of flange 57 of the insert member 50 in the prior embodiment. Thus each flange 79 is provided with a shoulder 80 adapted to abut a stop pin 81 secured in the inner face of the associated feed nut in a specific relation to the threaded engagement of the feed screw as described in the second embodiment above. The stop pin 81 serves to limit rotation of the insert member in a selected direction. The head portion 78 also includes an outer circular annular flange 82 which is provided with an outer annular edge face adapted to abut the edge face of the other opposed insert member 75 as at 83.

Means for biasing said insert members together for abutting engagement as at 83 for spreading apart said feed nuts may comprise a coil spring 84 for each insert member. Coil spring 84 associated with insert member 75 which is threaded in feed nut 16' may be biased to the right while coil spring 84 associated with the other feed nut 17" biases said insert member to the left. It will thus be apparent that the insert members 75 biased in opposite directions and having threaded engagement with internal threads of the associated feed nuts in the same directions as the pitch of the feed screw threads will cause abutment of said members and will spread apart the feed nuts 16" and 17". Thus whether the feed nut means 15" is advanced or retracted along the feed screw 11" the insert members 75 will cooperably engage to eliminate any end play or slack which might be present in the threaded engagement of the insert members 75 with the feed screw.

It will be noted that in this embodiment of the present invention, the feed nut 17" is fixed to the tool slide member 10" and compensation for end play is achieved by the resilient biasing of insert members towards each other at all times. It is understood in this embodiment that the feed nuts 16" and 17" may be integrally connected and that the insert members may be mounted in different manner as long as they are biased in opposite directions.

While the embodiments of this invention shown above disclose the use of two insert members, it is understood that one insert member may be employed as in feed nut 16 whereby the extension means 30 would be provided by such insert member.

In the arrangement of threads for the feed nut means it has been found effective that where the threads of the feed screw are pitched five threads per inch in one direction, the external threads of the extension means or insert members may be pitched three threads per inch in the opposite direction.

It is important to note that in each embodiment the feed nuts are capable of relative movement and that they are maintained in yieldable spread-apart relation by means acting between said feed nuts. Thus end play or slack, in the feed nut means, is automatically eliminated even upon a change in direction of feed and difference in wear along portions of the feed screw is compensated for automatically by the feed nut construction described above.

It is understood that changes and modifications may be made in the feed nut means described above which come within the spirit of this invention and all such changes and modifications coming within the scope of the appended claims are embraced thereby.

I claim:

1. Means for preventing end play in a machine tool feeding mechanism and for automatically compensating for variations in wear in such a mechanism comprising, in combination: a rotatable feed screw having threads pitched in one direction; a feed nut means threadingly engaging said feed screw and adapted to be associated with a cutting tool for advancing and retracting said tool, said feed nut means including a pair of spaced feed nuts, one of said feed nuts having a flat end face directed toward the other feed nut and having a loose connection in said feeding mechanism for limited axial movement relative to the other feed nut, said other feed nut having extension means directed toward and spaced from said end face on the said one feed nut, said extension means being provided with external threads pitched in a direction opposite to the threads of the feed shaft; a movable nut threaded on said extension means and provided with a flat end face for abutment against the flat end face of said one feed nut; and means biasing the movable nut against said one feed nut for abutting engagement of said end faces whereby said feed nuts are spread apart and whereby said one feed nut may automatically adjust by varying the spaced relation between said feed nuts for variation in wear of the threads of the feed screw.

2. Means for preventing end play in a machine tool feeding mechanism and for automatically compensating for variations in wear in such a mechanism comprising, in combination: a rotatable feed screw having threads pitched in one direction; a feed nut means threadedly engaging said feed screw and adapted to be associated with a cutting tool for advancing and retracting said tool, said feed nut means including a pair of spaced feed nuts, one of said feed nuts having an end face directed toward the other feed nut and having a loose connection in said feeding mechanism for limited axial movement relative to the other feed nut, said other feed nut having extension means directed toward and spaced from said end face on the said one feed nut, said extension means being provided with threads pitched in a direction opposite to the threads of the feed shaft; a movable nut threaded on said extension means and provided with an end face for abutment against the end face of said one feed nut; and means biasing the movable nut against said one feed nut for abutting engagement of said end faces whereby said feed nuts are spread apart and whereby said one feed nut may automatically adjust by varying the spaced relation between said feed nuts for variation in wear of the threads of the feed screw.

3. A means as defined in claim 2 wherein said extension means includes an insert member having external threads engaging internal threads on said other feed nut and being provided with internal threads engaging said feed screw.

4. A means as defined in claim 3 wherein the external threads of said insert member are pitched in a direction opposite to the pitch of the threads of the feed screw.

5. Means for preventing end play in a machine tool feeding mechanism comprising, in combination: a rotatable feed screw having threads pitched in one direction; a feed nut means threadedly engaging said feed screw and adapted to be associated with a cutting tool for advancing and retracting said tool; said feed nut means including a pair of spaced feed nuts, one of said feed nuts having an end face directed toward the other feed nut, said other feed nut having extension means directed toward and spaced from said end face; said extension means having threads pitched in a direction opposite to the threads on the feed shaft; a movable nut threaded on said extension means and having an end face for abutment with said end face on said one feed nut; and means for biasing the movable nut toward said one feed nut for urging said end faces into abutting engagement.

6. A means as defined in claim 5 wherein said extension means is integral with the said other feed nut.

7. A means as defined in claim 5 wherein each of said feed nuts comprises an insert member provided with internal threads engaging the threads of the feed screw and external threads pitched in a direction opposite to the threads of the feed screw engaging internal threads on said feed nuts.

8. A means as defined in claim 7 wherein spring means are carried by each insert member for biasing said insert member in one direction.

9. A means as defined in claim 8 wherein stop means are provided on each feed nut for limiting turning of the associated insert member in one direction.

10. An immediately acting bidirectional back lash take-up means for a tool feeding mechanism comprising, in combination: a rotatable feed screw; a feed nut means threaded on said screw and adapted to be associated with a cutting tool to be positioned, said feed nut means including a pair of spaced apart feed nuts, one of said nuts being mounted for limited movement relative to the other nut; and means carried by one of said feed nuts between said spaced feed nuts for spreading said feed nuts apart, said spreading means includes a movable nut carried by one of said feed nuts and biased into abutting engagement with the other of said feed nuts whereby one of said feed nuts cooperably engages said feed screw for advancement of said tool in one direction without end play and said other feed nut cooperably engages said feed screw for retraction of said tool in the other direction without end play between said feed nut and said screw.

References Cited in the file of this patent

UNITED STATES PATENTS

| | | |
|---|---|---|
| 525,780 | Boynton | Sept. 11, 1894 |
| 1,718,469 | Maag | June 25, 1929 |
| 1,955,954 | Dumser | Apr. 24, 1934 |
| 2,252,796 | Whittell | Aug. 19, 1941 |
| 2,679,168 | Rokos | May 25, 1954 |

OTHER REFERENCES

Product Engineering, pp. 302–303, July 1939.